(12) United States Patent
Kobayashi

(10) Patent No.: US 10,175,679 B2
(45) Date of Patent: Jan. 8, 2019

(54) THREE-DIMENSIONAL PRINTING SYSTEM INCLUDING THREE-DIMENSIONAL PRINTING APPARATUS AND SUPPORT ARRANGEMENT DETERMINING APPARATUS, AND METHOD OF DETERMINING SUPPORT ARRANGEMENT

(71) Applicant: Roland DG Corporation, Hamamatsu-shi, Shizuoka (JP)

(72) Inventor: Kouichi Kobayashi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 296 days.

(21) Appl. No.: 15/183,880

(22) Filed: Jun. 16, 2016

(65) Prior Publication Data

US 2016/0370793 A1    Dec. 22, 2016

(30) Foreign Application Priority Data

Jun. 17, 2015    (JP) ................. 2015-122386

(51) Int. Cl.
G05B 19/4099    (2006.01)

(52) U.S. Cl.
CPC ........... *G05B 19/4099* (2013.01); *G05B 2219/49023* (2013.01)

(58) Field of Classification Search
CPC ...... G05B 19/4099; G05B 2219/49023; G05B 2219/49041; B29C 64/00
USPC ........................................ 700/118
See application file for complete search history.

(56) References Cited

U.S. PATENT DOCUMENTS

| | | | | |
|---|---|---|---|---|
| 5,402,351 | A * | 3/1995 | Batchelder | B29C 41/36 264/401 |
| 9,688,024 | B2 * | 6/2017 | Stava | B29C 67/0088 |
| 2002/0155189 | A1 | 10/2002 | John | |
| 2015/0134095 | A1 * | 5/2015 | Hemani | G06T 19/00 700/98 |
| 2016/0096330 | A1 * | 4/2016 | Trowbridge | B33Y 10/00 264/104 |
| 2016/0136896 | A1 * | 5/2016 | Wighton | B29C 67/0088 700/120 |
| 2016/0305767 | A1 * | 10/2016 | Sano | B41J 2/2103 |
| 2016/0368223 | A1 * | 12/2016 | Kobayashi | B29C 67/0088 |
| 2017/0173891 | A1 * | 6/2017 | Bosveld | B29C 64/106 |

FOREIGN PATENT DOCUMENTS

JP    2003-039564 A    2/2003

* cited by examiner

*Primary Examiner* — Chun Cao
(74) *Attorney, Agent, or Firm* — Keating & Bennett, LLP

(57) ABSTRACT

A support arrangement determining apparatus includes a reference processor that shifts and rotates a target object model, a candidate generating processor that generates inclination angles that are candidates for the orientation of the target object to be formed, a support calculating processor that calculates a number of supports to be attached and arranged on the target object, and an inclination angle determining processor that determines, among a plurality of inclination angles generated by the candidate generating processor, an inclination angle that enables the supports to support the load of the target object and that reduces or minimizes the number of the supports calculated by the support calculating processor, and with the inclination angle the target object is inclined from the predetermined reference orientation.

10 Claims, 9 Drawing Sheets

G0₁ (90,0,30)
G0₂ (0,30,60)
G0₃ (45,60,0)
⋮

G1₁ (0,30,60) → 10 → J₁
G1₂ (45,55,65) → 15 → J₂
G1₃ (45,60,0) → 20 → J₃
⋮

G1₁ (0,30,60)    G1₂ (45,55,65)

G1₁₂ (0,55,60)    G1₂₁ (45,30,65)

GSₙ (50,60,70)

GSₙ' (60,70,50)

THREE-DIMENSIONAL PRINTING SYSTEM INCLUDING THREE-DIMENSIONAL PRINTING APPARATUS AND SUPPORT ARRANGEMENT DETERMINING APPARATUS, AND METHOD OF DETERMINING SUPPORT ARRANGEMENT

CROSS REFERENCE TO RELATED APPLICATION

The present application claims priority from Japanese Patent Application No. 2015-122386, filed on Jun. 17, 2015, which is incorporated by reference herein in its entirety.

BACKGROUND OF THE INVENTION

1. Field of the Invention

The present invention relates to a support arrangement determining apparatus, a three-dimensional printing system, and a method of determining a support arrangement.

2. Description of the Related Art

A three-dimensional printing apparatus for forming a desired three-dimensional object (hereinafter referred to as a "target object") by successively stacking layers of a resin material each having a predetermined cross-sectional shape and curing the resin material is conventionally known. This type of three-dimensional printing apparatus forms a target object in the following manner. First, data of a cross-sectional shape of the target object are prepared using, for example, a CAD apparatus. Next, using the data of the cross-sectional shape, a resin layer having a corresponding shape to the cross-sectional shape is formed by curing a photocurable resin. Then, the resin layers corresponding to the cross-sectional shapes are successively stacked to form the target object.

As shown in JP 2003-39564 A, for example, the three-dimensional printing apparatus has a platform having an opening formed therein, a vat placed on the platform, for accommodating a photocurable resin, a holder disposed above the vat and capable of being raised and lowered, and a lighting device disposed below the platform, for emitting light. The light emitted from the lighting device is applied to the photocurable resin in the vat through the opening in the platform. The part of the photocurable resin in the vat that is exposed to the light is cured. By controlling the position of the light to be applied, the position of the resin to be cured can be changed as desired. As a result, a resin layer having a desired cross-sectional shape can be formed. Then, by elevating the holder step by step, resin layers can be formed consecutively toward the bottom. In this way, the desired target object is formed.

When elevating the holder step by step, a resin layer that has been formed needs to support the load of all the resin layers that are to be formed below that resin layer. If there is a resin layer with a small cross-sectional area, it is possible that the resin layer with a small cross-sectional area may not be able to support the load of all the resin layers therebelow. As a consequence, part of the target object may break while forming the target object. In order to prevent such breakage, as illustrated in FIG. 13, a plurality of support objects 130 for supporting part of the load of a target object 200 are attached between a portion of the target object 200 and a holder 113 while forming the object through computing with a dedicated apparatus, such as a CAD apparatus. Then, a whole object in which the target object 200 and the support objects 130 are integrated with each other is formed. Hereinafter, the support objects may simply be referred to as "supports."

The supports 130 are attached and arranged, for example, on one of the surfaces of the target object 200 that faces the holder 113. However, depending on the orientation of the target object 200 with respect to the holder 113, the surface of projection of the target object 200 with respect to the holder 113 has a small area, that is, the surface of projection that represents the outer circumferential shape of the target object 200 that is obtained when projecting the target object 200 onto the surface of the holder 113 facing the target object 200 has a small area. As a consequence, the number of the supports 130 for the target object 200 becomes insufficient, so that the supports 130 may not be able to support the load of the target object 200 during object formation.

SUMMARY OF THE INVENTION

Preferred embodiments of the present invention provide a support arrangement determining apparatus, a three-dimensional printing system, and a method of determining a support arrangement that attach and arrange supports optimally with a three-dimensional printing apparatus wherein supports are attached and arranged onto a target object to be formed to form the target object.

A support arrangement determining apparatus according to a preferred embodiment of the present invention is an arrangement determining apparatus that determines a number and position arrangement of supports, for use with a three-dimensional printing apparatus wherein the supports are attached and arranged on a target object to be formed to form the target object and the supports. The arrangement determining apparatus includes a storing processor, a reference processor, a candidate generating processor, a support calculating processor, and an inclination angle determining processor. The storing processor is configured or programmed to store data of a three-dimensional model of the target object model. The reference processor is configured or programmed to shift and rotate the three-dimensional model stored in the storing processor so as to set the three-dimensional model into a predetermined reference position and orientation. The candidate generating processor is configured or programmed to generate a plurality of inclination angles that are candidates for setting the orientation of the target object to be formed, based on the three-dimensional model arranged to be in a reference position and orientation by the reference processor. The support calculating processor is configured or programmed to calculate the number of supports to be attached and arranged on the target object for each of the three-dimensional models inclined based on inclination angles generated by the candidate generating processor. The inclination angle determining processor is configured or programmed to determine, among the plurality of inclination angles generated by the candidate generating processor, an inclination angle that enables the supports to support a load of the target object and that significantly reduces or minimizes the number of the supports calculated by the support calculating processor, and with the inclination angle the target object is inclined from the predetermined reference orientation.

The arrangement determining apparatus preferably determines the inclination angle that enables the supports to support the load of the target object and also significantly reduces or minimizes the number of the supports, with the inclination angle the target object should be inclined from a predetermined reference orientation. Therefore, when forming the target object in the orientation that is determined in this way, the supports are able to support the load of the target object. In addition, because the number of supports is able to be kept small, the amount of the resin material necessary is able to be reduced when forming the supports.

In a preferred embodiment of the present invention, the inclination angle determining processor is configured or programmed to use a genetic algorithm to determine, among the plurality of inclination angles generated by the candidate generating processor, an inclination angle that enables the supports to support the load of the target object and that significantly reduces or minimizes the number of the supports calculated by the support calculating processor, and with the inclination angle the target object is inclined from the predetermined reference orientation.

For example, when all the inclination angles of the target object are calculated to obtain the optimum orientation of the target object, the computation becomes enormous, increasing computational burden. In the present preferred embodiment, however, the orientation of the target object to be formed is determined by using a genetic algorithm. Using a genetic algorithm makes it possible to prevent an enormous amount of computation, in comparison with the case in which all the inclination angles of the target object are calculated to obtain the optimum orientation of the target object. As a result, it is possible to reduce computational burden.

In another preferred embodiment of the present invention, an evaluation function J used in the genetic algorithm is represented by the following expression:

$J = L_s - S \times \max(G_t, A_s)$, where $L_s$ is the load of the target object that can be supported by the support, $G_t$ is the load of the target object, $A_s$ is the adhesive strength between the target object and the three-dimensional printing apparatus, and S is the safety factor.

The inclination angle determining processor is configured or programmed to calculate a value obtained from the evaluation function for each of the plurality of inclination angles generated by the candidate generating processor, and determine, among the inclination angles with a value of the evaluation function being greater than 0, an inclination angle that significantly reduces or minimizes the number of supports calculated by the support calculating processor, and with the inclination angle the target object model is inclined from the predetermined reference orientation.

With the present preferred embodiment, using the evaluation function J makes it possible to attach and arrange the supports so that the supports bear the greater one of the load $G_t$ of the target object to be formed or the adhesive strength $A_s$.

In another preferred embodiment of the present invention, the target object includes a forbidden surface in which the supports are not to be attached or arranged. The candidate generating processor is configured or programmed to exclude from the candidates such inclination angles that cause the supports to be attached and arranged on the forbidden surface.

In some cases, the target object to be formed may have a surface in which no support should be attached or arranged. In the present preferred embodiment, the surface of the target object in which no support should be attached or arranged is defined as a forbidden surface. Then, the candidate generating processor is able to select such inclination angles that result in an orientation that causes no support to be attached or arranged on the forbidden surface. As a result, the inclination angle at which no support is attached or arranged on the forbidden surface is used as the angle by which the target object should be inclined from a predetermined reference orientation.

In another preferred embodiment of the present invention, a pre-processing processor is provided to perform a smoothing process, which is a pre-process, on the three-dimensional model stored in the storing processor. The reference processor is configured or programmed to shift and rotate the three-dimensional model that has been subjected to the smoothing process by the pre-processing processor so as to set the three-dimensional model into a predetermined reference position and orientation.

The present preferred embodiment makes it possible to reduce the amount of data of the three-dimensional model by smoothing the three-dimensional model with the pre-processing processor. Therefore, the reference processor, the candidate generating processor, the support calculating processor, and the inclination angle determining processor are allowed to use a three-dimensional model the amount of data of which is reduced by the pre-processing processor. As a result, it is possible to reduce computational burden in a desirable manner.

A three-dimensional printing system according to a preferred embodiment of the present invention includes a three-dimensional printing apparatus, and any of the support arrangement determining apparatuses according to various preferred embodiments of the present invention described above.

The present preferred embodiment provides a three-dimensional printing system including any of the support arrangement determining apparatuses according to various preferred embodiments of the present invention described above.

A method of determining a support arrangement according to a preferred embodiment of the present invention is a method for determining a number and position arrangement of supports, for use with a three-dimensional printing apparatus wherein the supports are attached and arranged on a target object to be formed to form the target object and the supports. The method of determining a support arrangement includes a storing step, a reference step, a candidate generating step, a support calculating step, and an inclination angle determining step. The storing step stores data of a three-dimensional model of the target object. The reference step shifts and rotates the three-dimensional model stored in the storing step so as to set the three-dimensional model into a predetermined reference position and orientation. The candidate generating step generates a plurality of inclination angles that are candidates for the orientation of the target object to be formed, based on the three-dimensional model arranged in the predetermined reference position and orientation in the reference step. The support calculating step calculates the number of supports to be attached and arranged on the target object, for each of the three-dimensional models inclined based on the inclination angles generated in the candidate generating step. The inclination angle determining step determines, among the plurality of inclination angles generated in the candidate generating step, an inclination angle that enables the supports to support the load of the target object and that significantly reduces or minimizes the number of the supports calculated in the support calculating step, and with the inclination angle the target object is inclined from the predetermined reference orientation.

In another preferred embodiment of the present invention, the inclination angle determining step uses a genetic algorithm to determine, among the plurality of inclination angles generated in the candidate generating step, an inclination angle that enables the supports to support the load of the target object and that significantly reduces or minimizes the number of the supports calculated in the support calculating step, and with the inclination angle the target object is inclined from the predetermined reference orientation.

In another preferred embodiment of the present invention, an evaluation function J used in the genetic algorithm is represented by the following expression:

J=Ls−S×max(Gt, As), where Ls is the load of the target object that can be supported by the support, Gt is the load of the target object, As is the adhesive strength between the target object and the three-dimensional printing apparatus, and S is the safety factor.

The inclination angle determining step includes calculating a value obtained by the evaluation function for each of the plurality of inclination angles generated in the candidate generating step, and determining, among the inclination angles with an evaluation function value of greater than 0, an inclination angle that significantly reduces or minimizes the number of the supports calculated by in the support calculating step, and with the inclination angle the target object is inclined from the reference orientation.

In another preferred embodiment of the present invention, the target object includes a forbidden surface in which the supports are not to be attached or arranged. In the candidate generating step, such inclination angles that cause the supports to be attached and arranged on the forbidden surface are excluded from the candidates.

In another preferred embodiment of the present invention, the method further includes a pre-processing step of performing a smoothing process, which is a pre-process, on the three-dimensional model stored in the storing step, and wherein in the reference step, the three-dimensional model that has been subjected to the smoothing process in the pre-processing step is shifted and rotated so as to set the three-dimensional model into a predetermined reference position and orientation.

According to various preferred embodiments of the present invention, supports are attached and arranged optimally.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinbelow, three-dimensional printing systems including a support arrangement determining apparatus according to preferred embodiments of the present invention, as well as methods of determining a support arrangement, will be described with reference to the drawings. The preferred embodiments described herein are not intended to limit the present invention. The elements, features, components and steps that exhibit the same effects are denoted by the same reference symbols, and repetitive description thereof may be omitted as appropriate.

Figure 1:
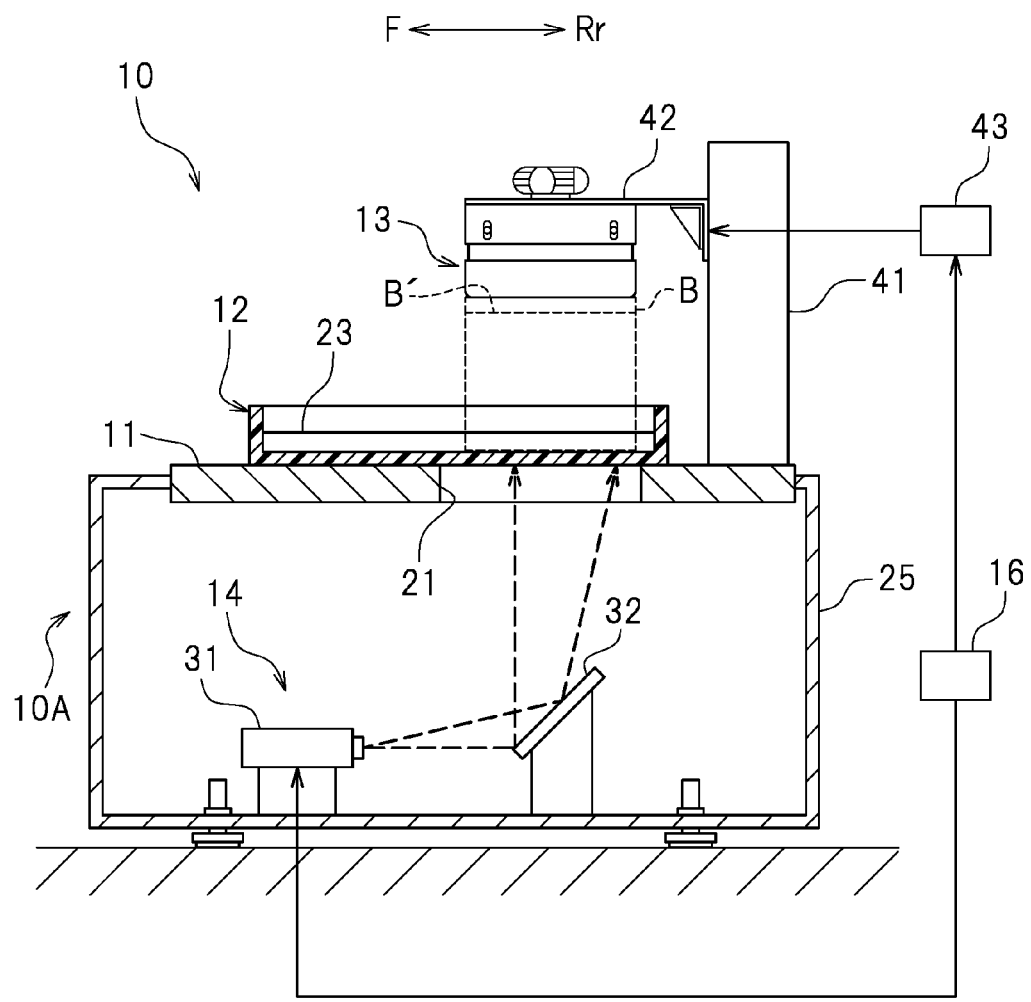
FIG. 1 is a cross-sectional view of a three-dimensional printing system according to a preferred embodiment of the present invention.
Figure 2:
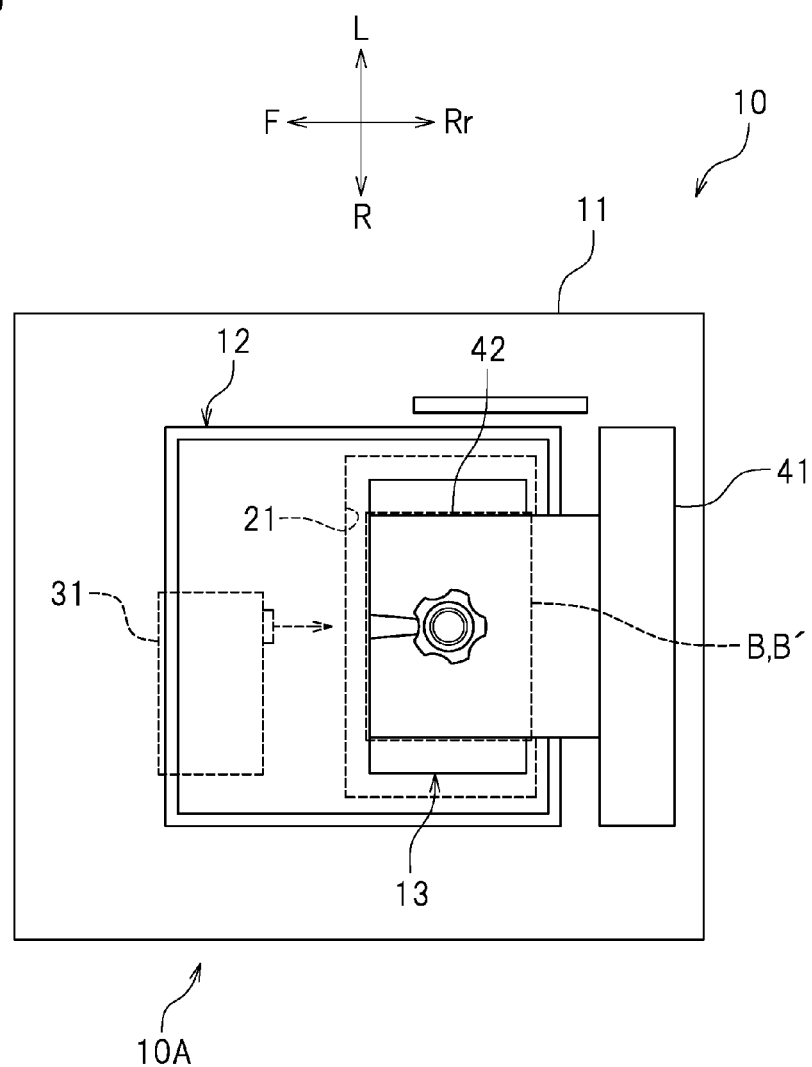
FIG. 2 is a plan view of a three-dimensional printing system according to a preferred embodiment of the present invention.

FIG. 1 is a cross-sectional view of a three-dimensional printing system 10 according to the present preferred embodiment. FIG. 2 is a plan view of the three-dimensional printing system 10. In the drawings, reference characters F, Rr, L, and R indicate front, rear, left, and right, respectively. These directional terms are, however, merely provided for purposes in illustration and are not intended to limit the preferred embodiments of the three-dimensional printing system 10 in any way.

The three-dimensional printing system 10 is a system that forms a target object using supports. Hereinafter, the entire object including the target object and supports is referred to as a whole object. The three-dimensional printing system 10 uses data of a plurality of cross-sectional shapes of the whole object. Here, the term "cross-sectional shape" refers to the shape of the cross section of each of the layers when the whole object is divided into a plurality of layers. The three-dimensional printing system 10 forms resin layers having shapes corresponding to the cross-sectional shapes by curing a liquid photocurable resin. Then, the resin layers are stacked successively layer by layer to form the whole object. Note that the term "photocurable resin" refers to a resin that is cured when exposed to light containing a predetermined wavelength.

As illustrated in FIG. 1, the three-dimensional printing system 10 includes a three-dimensional printing apparatus 10A and an arrangement determining apparatus 100 (see FIG. 3) to determine the orientation of the target object and the configuration of the supports, such as positions, shapes, and number of the supports, prior to forming the whole object with the three-dimensional printing apparatus 10A.

The three-dimensional printing apparatus 10A includes a platform 11, a vat 12, a holder 13, a lighting device 14, and a controller 16.

The platform 11 is supported by a case 25. An opening through which light is allowed to pass is provided in the platform 11. The vat 12 accommodates a liquid photocurable resin 23. The vat 12 is provided on the platform 11. As illustrated in FIG. 2, the vat 12 covers the opening 21 of the platform 11 when placed on the platform 11. The vat 12 is formed of a material capable of transmitting light. For example, the vat 12 is formed of a transparent material.

As illustrated in FIG. 1, the holder 13 is disposed above the vat 12 and above the opening 21 of the platform 11. The holder 13 is configured or programmed to be capable of being raised and lowered. The holder 13 is immersed into the photocurable resin 23 in the vat 12 when it is lowered. When it is raised, the holder 13 lifts the photocurable resin 23 that has been cured by exposure to the light. Herein, the platform 11 is provided with a supporting pillar 41 extending vertically. A slider 42 is mounted in front of the supporting pillar 41. The slider 42 is capable of being raised and lowered along the supporting pillar 41. The slider 42 is moved upward or downward by a motor 43. Herein, the holder 13 is fitted to the slider 42. The holder 13 is moved upward or downward by the motor 43.

The lighting device 14 is disposed below the platform 11. The lighting device 14 applies light having a predetermined wavelength to the photo-curable resin 23 accommodated in the vat 12. The lighting device 14 is accommodated in a case 25 provided below the platform 11. The lighting device 14 includes a projector 31 and a mirror 32. The projector 31 is a light source that emits light. The mirror 32 is a member that reflects the light emitted from the projector 31 toward the vat 12. The mirror 32 is disposed below the opening 21 in the platform 11 and behind the projector 31. The light emitted from the projector 31 is reflected by the mirror 32, and is applied through the opening 21 of the platform 11 to the photocurable resin 23 in the vat 12. It should be noted, however, that the arrangement and configuration of the lighting device 14 are not restricted to particular arrangements or configurations.

The controller 16 is connected to the motor 43, which controls the slider 42 fitted with the holder 13 to be raised and lowered, and is connected to the projector 31 of the lighting device 14. The controller 16 is configured or programmed to drive the motor 43 to move the slider 42 and the holder 13 upward or downward. The controller 16 also controls various parameters of the light emitted from the projector 31, such as energy, luminous intensity, light quantity, light wavelength band, light shape, position of the light to be applied, and timing at which light is emitted. It should be noted that the configuration of the controller 16 is not limited to specific configurations. For example, the controller 16 may be a computer, and may include a central processing unit (hereinafter also referred to as "CPU"), a ROM for storing programs or the like to be executed by the CPU, and a RAM.

Hereinabove, a configuration of the three-dimensional printing apparatus 10A has been described. As described previously, the three-dimensional printing apparatus 10A forms a target object using supports. Next, a description concerning supports will be given below.

When the three-dimensional printing apparatus 10A forms a target object, the holder 13 is raised step by step each time a resin layer is formed, and a new resin layer is formed below the preceding layer. If, after forming a resin layer having a large cross-sectional area, there is a relatively small resin layer, for example, a small resin layer having a size such that the contact area thereof with the holder 13 is less than half the contact area of the larger resin layer, the smaller resin layer may not be able to support the load of all the resin layers positioned therebelow, including the larger resin layer. As a consequence, there is a risk that the target object may break during object formation. In view of this problem, supports are attached and arranged on the target object in order to sufficiently support the load of the target object during object formation. This can prevent the target object from breaking during object formation.

Figure 3:
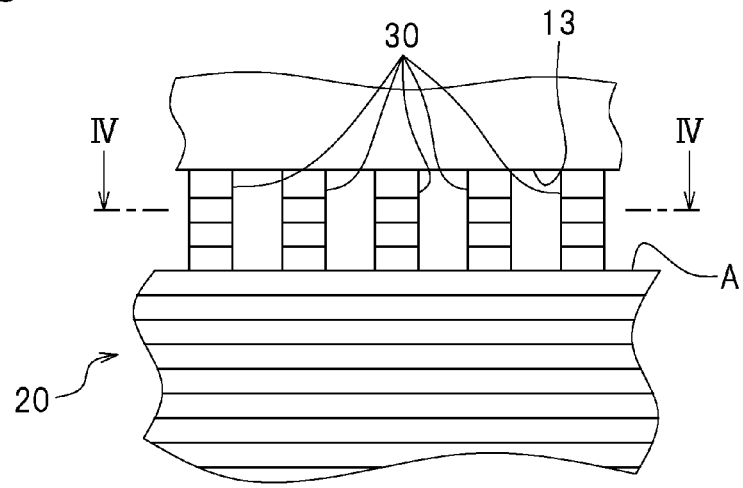
FIG. 3 is a schematic view illustrating the way in which a whole object is formed on the holder.

Assuming that the three-dimensional printing apparatus 10A forms a target object directly on the holder 13, the target object is peeled off from the holder 13 after object formation. Then, when the portion of the target object that is in contact with the holder 13 is peeled from the holder 13, the target object may break in some cases. In view of this problem, supports 30 are attached and arranged between the holder 13 and the target object A, as illustrated in FIG. 3. Then, after the whole object (which is the object in which the supports 30 are attached and arranged on the target object A) has been peeled away from the holder 13 subsequent to completion of the object formation, the process of removing the supports 30 from the target object A may be carried out. This prevents the target object A from breaking.

Figure 4:
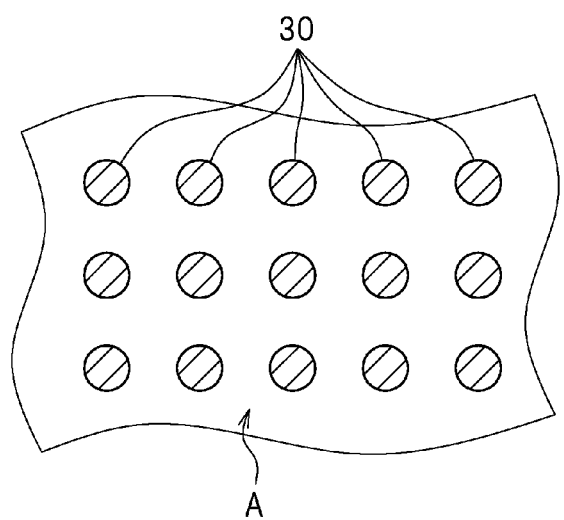
FIG. 4 is a cross-sectional view taken along line IV-IV in FIG. 3.

It should be noted that the shapes of the supports 30 are not limited to specific shapes. FIG. 4 is a cross-sectional view taken along line IV-IV in FIG. 3. In the present preferred embodiment, a plurality of cylindrical columns having the same thickness are preferably used as the supports 30, as illustrated in FIG. 4. Herein, as illustrated in FIG. 3, the upper end portion of each of the supports 30 is provided on the holder 13. The lower end portion thereof is provided on the target object A. The intervals between adjacent supports 30 are not limited to specific intervals. However, in the present preferred embodiment, the intervals preferably are uniform, or substantially uniform. As illustrated in FIG. 4, a plurality of supports 30 are attached and arranged at positions that are aligned with respect to a left-right direction and a front-rear direction. It should be noted, however, that the above-described shape and position arrangement of the supports 30 are merely exemplary. The shape of the supports 30 may be, for example, a triangular or quadrangular shape in cross section. The shapes of the plurality of supports 30 may be either the same as or different from each other. The intervals between adjacent supports 30 need not be uniform. The plurality of supports 30 may be attached and arranged, for example, in a staggered arrangement.

Next, the conditions under which the supports 30 support the load of the target object A will be discussed below. First, in order for the supports 30 to support the load of the target object A, the load that can be supported by the supports 30 preferably is higher than the load of the target object A. In addition, in the three-dimensional printing apparatus 10A, an adhesive strength arises between the surface of the vat 12 and the resin layer. For this reason, in order to peel the resin layer away from the vat 12, it is necessary to lift the target object A with a force that is greater than the adhesive strength. At this time, the same amount of force as the adhesive force acts on the supports 30. Therefore, in order to prevent the supports 30 from breaking, the load that can be supported by the supports 30 preferably is be greater than the just-mentioned adhesive strength. From the foregoing, where the load that can be supported by the supports 30 (hereinafter referred to as "supportable load") is Ls [gf], the load of the target object A is Gt [gf], and the adhesive strength between the vat 12 and the resin layer of the target object A is As [gf], it is preferable that Ls be greater than the greater one of Gt and As. That is, it is preferable that Ls>max(Gt, As).

The supportable load Ls can be represented by the following expression (1), where the area of a single support 30 that is in contact with the target object A is Sp, the tensile strength thereof is Kp, and the number of the supports 30 is I:

$$Ls = Sp \times Kp \times I. \quad (1)$$

The load Gt of the target object A can be represented by the following expression (2), where the volume of the target object A is Va and the density of the target object A is Da:

$$Gt = Va \times Da. \quad (2)$$

The adhesive strength As can be represented by the following expression (3), where the volume of the target object A that has been layered from the first to the n-th layer is Vn, the cross-sectional area of the n-th layer of the target object A is Sn, and the stress (tensile stress) of the target object A is K:

$$As = Vn \times Da + Sn \times K. \quad (3)$$

In the present preferred embodiment, the surface of the vat 12 (see FIG. 1) made of resin has a plurality of microcavities formed therein. When light is applied to the photocurable resin 23 while the microcavities are holding the photocurable resin 23 therein, some portion of the photocurable resin 23 is cured while trapped inside the microcavities. When the cured photocurable resin 23 is pulled up out of the vat 12, the photocurable resin 23 trapped and cured in the microcavities should be pulled out of the microcavities, so the adhesive strength As becomes correspondingly greater. Therefore, in such a case, the adhesive strength As becomes slightly greater. However, the adhesive strength As herein does not take into consideration such a load that is applied when the photocurable resin 23 is pulled out of the microcavities of the vat 12. That said, when obtaining the adhesive strength As, it is also possible to take into consideration the load that is applied when the photocurable resin 23 is pulled out of the microcavities of the vat 12.

Theoretically, when Ls>max(Gt, As), it is impossible that the supports 30 break. However, in reality, there are some cases where the supports 30 can break even when Ls>max (Gt, As), due to various uncertain factors. So, it is possible to introduce safety factor S, which must be a real number greater than 1, to set the condition for the supports 30 to sufficiently support the load of the target object A according to the following expression (4):

$$Ls > S \times max(Gt, As). \quad (4)$$

For example, it can be assumed that in the case where the safety factor S=3, the supports 30 can only support ⅓ of the supportable load Ls that is expected to be actually applied thereto. When the above expression (4) is satisfied, the supports 30 can sufficiently support the load of the target object A.

As described previously, the three-dimensional printing apparatus 10A forms the target object A by raising the holder 13 step by step. The target object A is formed successively from the top toward the bottom. Using data of a three-dimensional model (hereinafter referred to as "target object model") of the target object A, the three-dimensional printing apparatus 10A forms a target object A having the same or substantially the same shape as that of the target object model.

The target object model has an orientation that has been determined in advance (hereinafter referred to as "initial orientation"). This initial orientation is generally determined according to the data producing procedure of the target object model. For example, when the target object model is a decorative object in a conical shape, the initial orientation is determined so that the vertex of the cone is positioned upward and the bottom surface thereof is positioned downward. However, as will be discussed below, it is not always appropriate to form the target object A without changing its initial orientation.

First, depending on the orientation of the target object A, there are cases where a sufficient number of supports 30 cannot be attached or arranged because the area of the surface of the target object A that faces the holder 13 is small.

A whole object, in which the target object A and the supports 30 are integrated with each other, is formed by curing the photocurable resin 23 in the vat 12. This means that the region in which the whole object can be formed is limited to the region above the vat 12. Moreover, the light from the lighting device 14 is applied to the photocurable resin 23 in the vat 12 through the opening 21. This means that the region in which the whole object can be formed is limited to the region above the opening 21. Furthermore, the whole object is formed by being suspended by the holder 13. This means that the region in which the whole object can be formed is limited to the region below the holder 13. Thus, the object formable region in the three-dimensional printing apparatus 10A is, when viewed in a plan view, a region that is inward of the outer edge of the holder 13, inward of the peripheral edge of the opening 21 of the platform 11, and inward of the inner edge of the vat 12. The object formable region is, with respect to its vertical position, a region between the bottom surface of the holder 13 and the top surface of the bottom plate of the vat 12 when the holder 13 is moved to the topmost position.

Figure 5A:
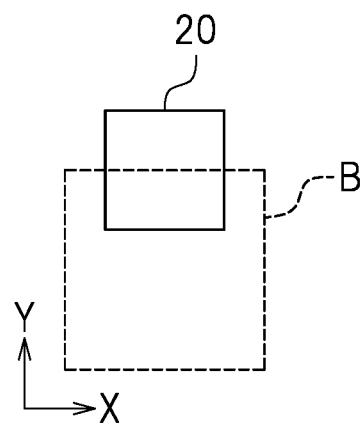
FIG. 5A is a view illustrating the relationship between the whole object and an object formable region, which shows that the whole object extends out of the object formable region.
Figure 5B:
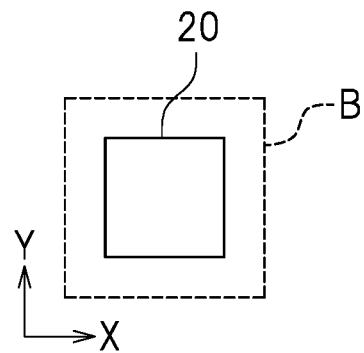
FIG. 5B is a view illustrating the relationship between the whole object and an object formable region, which shows that the whole object fits within the object formable region.

If the whole object does not fit within the just-described object formable region, that portion of the whole object cannot be formed. However, for example, even when the whole object is such a whole object 20 that it extends out of an object formable region B when it is attempted to form the object with the position and orientation of the target object model being as shown in FIG. 5A, it may be possible to fit the whole object 20 within the object formable region B by changing the position and orientation of the target object model as shown in FIG. 5B. Thus, it is necessary to determine the position and orientation of the target object model so that the whole object 20 fits within the object formable region B.

As described previously, by attaching and arranging the supports 30 between the holder 13 and the target object A, it is possible to prevent a portion of the target object A from breaking when the whole object 20 is peeled away from the holder 13 after completion of the object formation. Accordingly, the present preferred embodiment avoids directly forming the target object A onto the holder 13, but attaches and arranges the supports 30 between the holder 13 and the target object A. In order to do so, space for attaching and arranging the supports 30 needs to be provided between the target object A and the holder 13. In the present preferred embodiment, the space extending by a predetermined size (for example, about 5 mm) downward from the top end of the object formable region B is set as the space for the supports 30, and the region of the object formable region B excluding the space for the supports 30 is defined as an object formation region B' (see FIGS. 1 and 2) for forming the target object A. Thus, it is necessary to determine the position and orientation of the target object A so that target object A fits within the object formation region B'.

Figure 6:
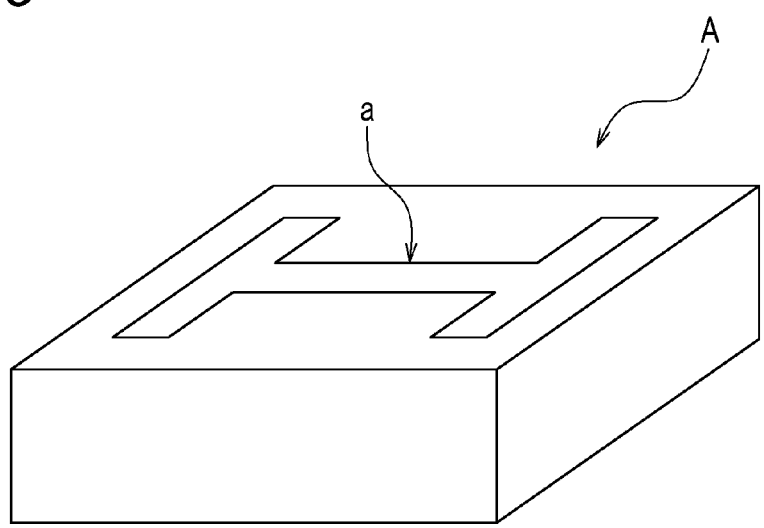
FIG. 6 is a perspective view illustrating one example of a target object.

As illustrated in FIG. 6, the target object A may be one that has a surface a (decorative surface) that is decorated with such things as characters or patterns. When forming such a target object A, it is preferable that no support 30 be attached or arranged on the decorative surface a. The reason is that there is a risk of damaging the decorative surface a of the target object A when peeling supports 30 away from the target object A. When forming such a target object A, it is preferable that the decorative surface a be provided with no support 30. Accordingly, when the target object A has a surface in which no support 30 should be attached or arranged (hereinafter referred to as a "forbidden surface"), it is preferable that the position and orientation of the target object A be determined so that no support 30 is attached or arranged on the forbidden surface.

As described above, when forming a target object A with the three-dimensional printing apparatus 10A, there are requirements to be considered, in addition to the capability of the supports 30 sufficiently supporting the load of the target object A. In view of this, the three-dimensional printing system 10 according to the present preferred embodiment is configured or programmed to determine the position and orientation of the target object A by the arrangement determining apparatus 100 before forming the whole object 20 with the three-dimensional printing apparatus 10A so that the load of the target object A is sufficiently supported by the supports 30 while satisfying predetermined requirements.

It should be noted that if the number of supports 30 attached and arranged on the target object A is too small, the supports 30 cannot sufficiently support the load of the target object A. On the other hand, the supports 30 must be removed from the target object A after completion of the formation of the whole object 20. This means that if the number of the supports 30 is so large, it takes much time and trouble to remove them from the target object A. Moreover, the amount of photocurable resin 23 that is consequently wasted becomes larger. From these viewpoints, it is preferable that the number of supports 30 be a minimum number with which the load of the target object A is able to be sufficiently supported. The arrangement determining apparatus 100 determines the position and orientation of the target object A so that the above-described requirements is satisfied and the number of supports 30 can become a minimum number within the range in which the load of the target object A is sufficiently supported.

Figure 7:
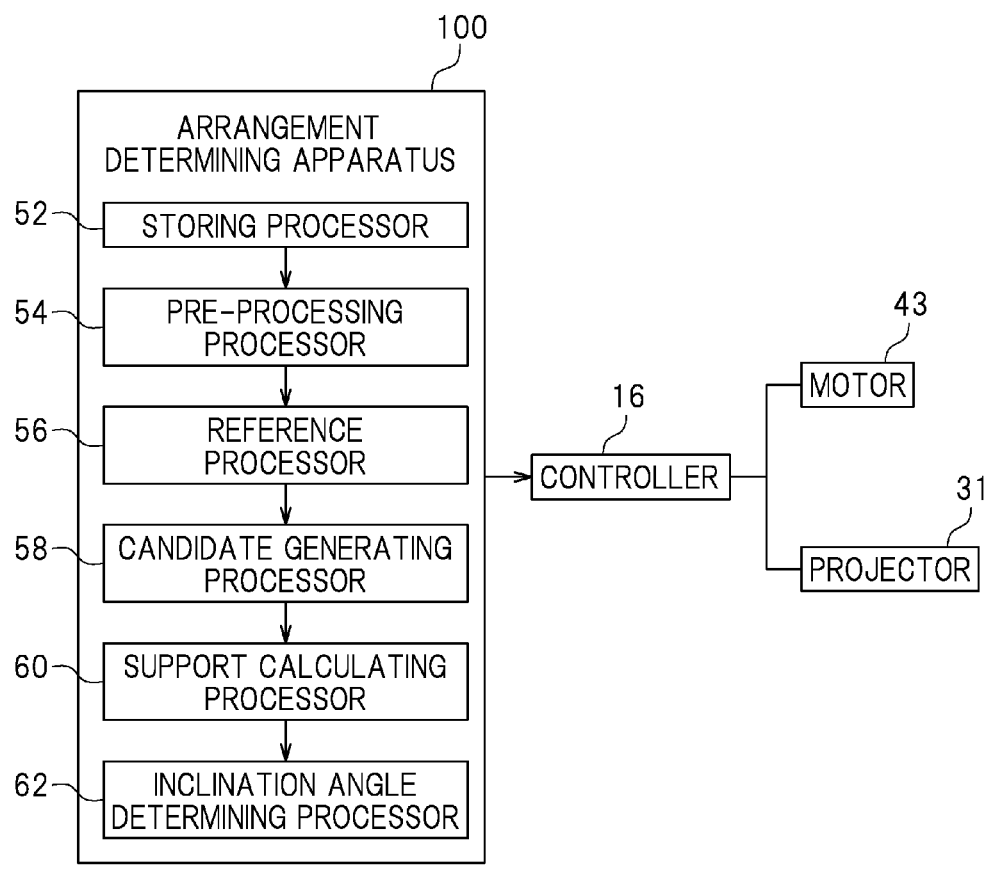
FIG. 7 is a block diagram of the three-dimensional printing system.

FIG. 7 is a block diagram of the three-dimensional printing system 10. In the following, the arrangement determining apparatus 100 will be described with reference to FIG. 7. The arrangement determining apparatus 100 determines the position and orientation of a target object A to be formed when forming a whole object 20 and also determining the configurations of supports 30 such as position, shape, and number of supports 30. The arrangement determining apparatus 100 may be either a separate apparatus from the three-dimensional printing apparatus 10A or may be integrated in the three-dimensional printing apparatus 10A. For example, the arrangement determining apparatus 100 may be a computer, and may include a CPU, a ROM for storing programs or the like to be executed by the CPU, a RAM, and so forth. The arrangement determining apparatus 100 may be either a dedicated computer designed for the three-dimensional printing system 10 or a general-purpose computer. Herein, the arrangement determining apparatus 100 includes a storing processor 52, a pre-processing processor 54, a reference processor 56, a candidate generating processor 58, a support calculating processor 60, and an inclination angle determining processor 62. Each of these processors preferably is achieved by executing a computer program (hereinafter referred to as "program") stored in the arrangement determining apparatus 100.

The storing processor 52 is configured or programmed to store data of the target object model. The data of the target object model are, for example, data identified by a set of a plurality of points in an XYZ orthogonal coordinate system, and are three-dimensional data. The data of the target object model are read from a recording medium or another computer (not shown) into the storing processor 52 by, for example, a user action. In the present preferred embodiment, the position and orientation of the target object A preferably is identified by three-axis orthogonal coordinates. However, it is also possible to identify the position and orientation of the target object A using other coordinate systems.

The data of the target object model are, in many cases, detail data that faithfully reproduce the three-dimensional shape of the target object model. If the data of the target object model are used as they are, it may take a long time to perform the determination process with the arrangement determining apparatus 100. For this reason, it is preferable to reduce the amount of data by performing pre-processing of the data of the target object model. Herein, the pre-processing processor 54 is configured or programmed to perform a smoothing process on the data of the target object model stored in the storing processor 52. The target object model is, for example, a model in which a plurality of triangles are combined. In that case, the smoothing process is desirably a process of reducing the number of the triangles of the target object model to reduce the amount of the data. The method of smoothing process is not limited, and any conventionally known method of smoothing process may be used. For example, a Gaussian function may be used as a method of smoothing process.

The reference processor 56 is configured or programmed to shift and rotate the target object model that has been subjected to the smoothing process by the pre-processing processor 54 and that is stored in the storing processor 52 so as to set the target object model into a predetermined reference position and orientation. In the present preferred embodiment, the position and orientation of the target object A are preferably identified by three-axis orthogonal coordinates. However, it is also possible to identify the position and orientation of the target object A using other coordinate systems. In the present preferred embodiment, the reference position of the target object A is set at the center of the target object A. However, the reference position is not limited to the center of the target object A. Here, the center of the target object A, which is the reference position, is set to be at the center of the holder 13 when viewed in a plan view. For example, the reference position $P_0$ of the target object A can be represented by x coordinate $x_0$, Y coordinate $y_0$, and z coordinate $z_0$. Also, the reference processor 56 sets the reference orientation of the target object A so that no support 30 is attached or arranged on the forbidden surface of the target object A. The method of setting the reference orientation will be described later.

The candidate generating processor 58 is configured or programmed to generate a plurality of inclination angles that are candidates for setting the orientation of the target object A to be formed, based on the target object model arranged to be in a reference position and orientation by the reference processor 56. Here, the orientation of the target object A can be represented by an X-axis rotation angle $\theta x$, a Y-axis rotation angle $\theta y$, and a Z-axis rotation angle $\theta z$ from the reference orientation. The term "inclination angle" collectively refers to the three rotation angles $\theta x$, $\theta y$, and $\theta z$.

The support calculating processor 60 is configured or programmed to calculate the number of supports 30 to be attached and arranged on the target object A for each of the target object models inclined based on the inclination angles generated by the candidate generating processor 58. Here, the support calculating processor 60 is configured or programmed to attach and arrange supports 30 on the target object model the orientation of which is changed according to the inclination angles according to a predetermined rule, to calculate the number of supports 30 attached and arranged on the target object model. The predetermined rule is desirably a conventionally known rule. Herein, a plurality of supports 30 are provided on the target object A so that the supports 30 are arranged at regular intervals in a front-rear direction and in a left-right direction.

The inclination angle determining processor 62 is configured or programmed to determine, among the plurality of candidate inclination angles generated by the candidate generating processor 58, such an inclination angle that enables the supports 30 to support the load of the target object and that significantly reduces or minimizes the number of the supports 30 calculated by the support calculating processor 60, with the inclination angle the target object A is inclined from the reference orientation. In the present preferred embodiment, the orientation of the target object A to be formed is determined using a genetic algorithm. The specific method of using the genetic algorithm will be described later.

Figure 8:
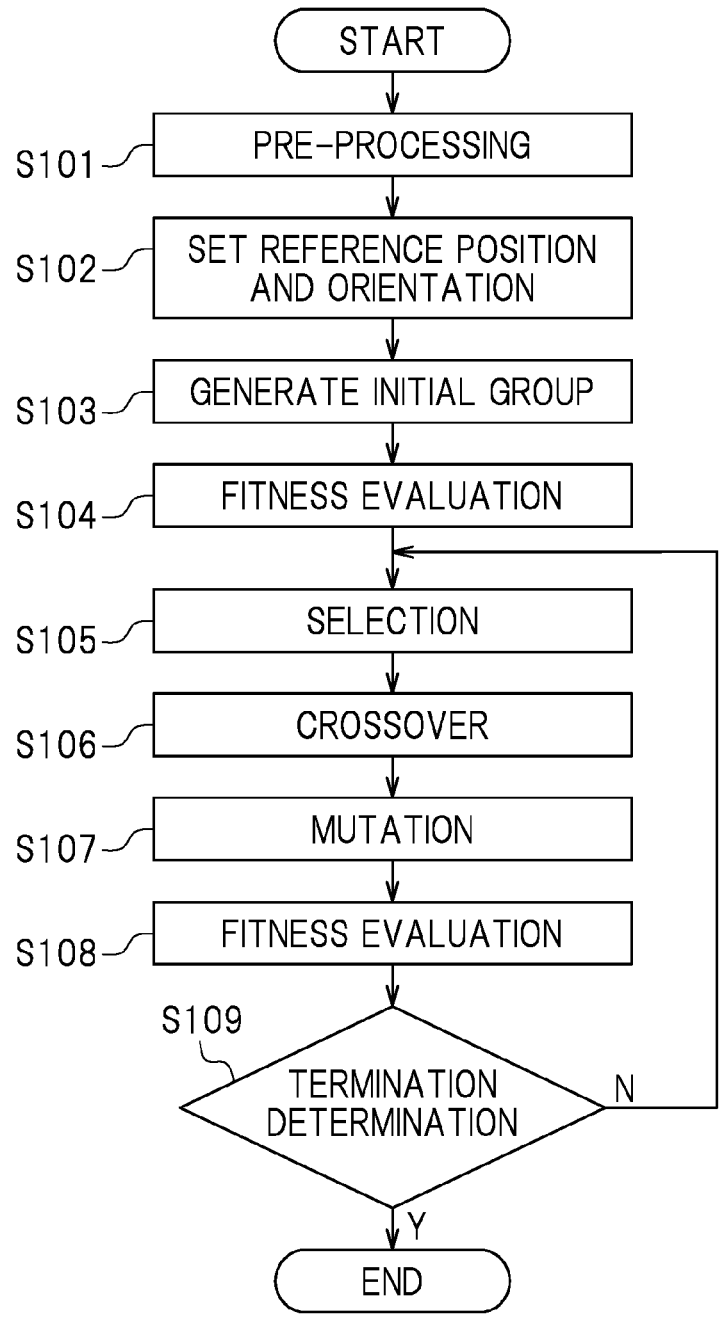
FIG. 8 is a flowchart illustrating a method of determining the number and position arrangement of the supports using a genetic algorithm.

Next, the method of determining the number and position arrangement of supports 30 will be described with reference to the flow-chart shown in FIG. 8. This determining method preferably utilizes a genetic algorithm, as described above. Herein, a genetic algorithm is used to determine the optimum position and orientation of the target object A. Then, supports 30 are attached and arranged on the target object A that is in the determined optimum position and orientation.

First, at step S101, a pre-process is performed on a target object model corresponding to the target object A to be formed. Herein, the pre-processing processor 54 performs a smoothing process on the target object model. In the following steps, the target object model that has been subjected to the smoothing process is used to determine the position and orientation of the target object A to be formed. Then, supports 30 are attached and arranged on the target object A the position and orientation of which have been changed.

Next, in step S102, the position and orientation of the target object A that serve as the reference position and orientation of the target object model are determined. Here, the reference processor 56 sets the reference position so that, when viewed in a plan view, the center of the target object A is located at a position that is in agreement with the center of the holder 13. Next, the reference processor 56 sets a forbidden surface of the target object A. As described previously, the forbidden surface is a surface of the target object in which supports 30 should not be attached or arranged (for example, the surface a in FIG. 6) and that is a decorative surface decorated with such things as characters or patterns. Herein, the optimum position and orientation of the target object are determined by rotating the target object A so that the supports 30 are not attached or arranged on the forbidden surface. In the present preferred embodiment, the orientation of the target object A that causes the forbidden surface to be the top surface of the target object A is set as the reference orientation. The reference orientation of the target object A is, however, not limited. Herein, the supports 30 are attached and arranged on the bottom surface of the target object A.

Next, at step S103, the candidate generating processor generates an initial group. At step S103, first, a predetermined number of individuals (hereinafter the number n of individuals) are generated. Each individual contains genes that are inclination angle, an X-axis rotation angle $\theta x$, a Y-axis rotation angle $\theta y$, and a Z-axis rotation angle $\theta z$, which are arranged in that order.

Herein, the inclination angle values should be within a range such that the supports 30 are not attached or arranged on the forbidden surface. In the present preferred embodiment, the range of the inclination angles is determined depending on which position the forbidden surface of the target object A is set. Herein, the range of the inclination angles is defined so that the forbidden surface is not positioned to be the bottom surface of the target object A, which is being disposed in a reference position and orientation. Herein, the ranges of values of the X-axis rotation angle $\theta x$, the Y-axis rotation angle $\theta y$, and the Z-axis rotation angle $\theta z$ preferably are, respectively, $-90° \leq \theta x \leq 90°$, $-90° \leq \theta y \leq 90°$, and $0° \leq \theta z \leq 360°$, for example. Herein, the genes in each of the individuals are determined by random numbers within the foregoing ranges.

Figures 9, 10, 11, 12:
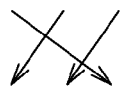
FIG. 9 is a view illustrating individuals in an initial group.
FIG. 10 is a view illustrating individuals after sorting.
FIG. 11 is a view illustrating one example in which new individuals are generated by two-point crossover.
FIG. 12 is a view illustrating one example of a photographed image.
Figure 13:
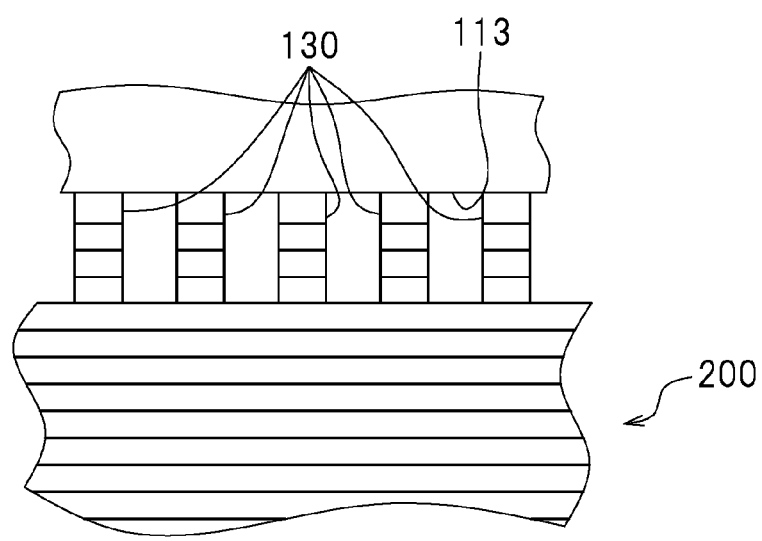
FIG. 13 is a schematic view illustrating the way in which a whole object is formed on the holder using conventional technology.

The target object A that is set by each of the individuals needs to fit within the object formation region B' (see FIG. 1). Therefore, if a target object A that is set by an individual does not fit within the object formation region B', the target object A should be shifted from the reference position so that the target object A fits within the object formation region B'. At that time, the storing processor 52 stores the position of the target object A that has been shifted. If the target object A cannot fit within the object formation region B' even when the target object A is shifted in any way, the individual is removed from the initial group. In this way, n individuals $G0_1$, $G0_2$, $G0_3$, . . . , $G0_n$, as illustrated in FIG. 9, are obtained, for example. Each of the target objects A set by the individuals $G0_1$, $G0_2$, $G0_3$, . . . , $G0_n$, is in an orientation such that the supports 30 are not attached or arranged on the forbidden surface, and it fits within the object formation region B'. Note that in FIGS. 9 to 12, the numerical values in parentheses represent an X-axis rotation angle $\theta x$, a Y-axis rotation angle $\theta y$, and a Z-axis rotation angle $\theta z$, in that order from the left.

Next, at step S104, the inclination angle determining processor 62 performs fitness evaluation. Herein, first, a target object model corresponding to the target object A is rotated to change its orientation according to the genes of each of the individuals, in other words, according to candidates for the inclination angles. Then, the support calculating processor 60 adds supports 30 to the target object model the orientation of which has been changed, according to a predetermined rule. Then, the support calculating processor 60 calculates the number of the supports 30 added to the target object model. Herein, a plurality of supports 30 are attached and arranged on the target object A so that the supports 30 are arranged at regular intervals in a front-rear direction and in a left-right direction, as described previously. Thereafter, an evaluation function J for each of the individuals is calculated using the number of the supports 30 of each of the individuals. Here, using the foregoing expressions (1) to (4), the evaluation function J can be expressed by the following expression (5).

$$J = Ls - S \times \max(Gt, As) = Sp \times Kp \times I - S \times \max(Va \times Da, Vn \times Da + Sn \times K) \quad (5)$$

Here, Ls is the load that can be supported by the supports 30 (i.e., supportable load), Gt is the load of the target object A, and As is the adhesive strength between the vat 12 and the resin layer of the target object A, as described previously.

In other words, the evaluation function J is a value obtained by subtracting the greater one of Gt and As from Ls. Note that Sp is the area of a single support 30 that is in contact with the target object A, Kp is the tensile strength thereof, I is the number of the supports 30, and S is the safety factor. Va is the volume of the target object A, Da is the density of the target object A, Vn is the volume of the target object A that has been layered from the first layer to the n-th layer, Sn is the cross-sectional area of the n-th layer of the target object A, and K is the stress (tensile stress) of the target object A.

Then, the inclination angle determining processor 62 compares the calculated values of the evaluation function J for the n individuals $G0_1$, $G0_2$, $G0_3$, . . . , $G0_n$. Herein, among the individuals with an evaluation function J value of greater than 0, the individuals with a smaller number of supports 30 are regarded as better individuals and given higher ranks. Then, the n individuals are sorted so that individuals with higher ranks are positions to be higher. In the present preferred embodiment, the genetic algorithm is set so that the evaluation function J itself is the number of supports 30. Therefore, where the sorted n individuals are $G1_1$, $G1_2$, $G1_3$, . . . , $G1_n$, the evaluation functions $J_1$, $J_2$, $J_3$, . . . , $J_n$ for the respective individuals are as shown in FIG. 10.

Next, at step S105, the inclination angle determining processor 62 performs selection. The selection is the step of selecting n better individuals from a set. In other words, the selection is that n individuals that earned higher ranks in the fitness evaluation are selected. Note that, in the first selection, all the individuals are selected because the number of individuals contained in the group is n.

Next, at step S106, the inclination angle determining processor 62 performs crossover. The technique of crossover is not limited, and various known techniques of crossover may be used.

It is also possible to use combinations of known crossover techniques. Herein, two-point crossover is used. In the two-point crossover, a pair is formed by the individual G11 that obtained the highest rank in the fitness evaluation at step S104 (hereinafter referred to as "best individual") and one of the other individuals $G1_2$, $G1_3$, . . . , $G1_n$. Then, a new individual in which the gene of the X-axis rotation angle and the gene of the Z-axis rotation angle of the best individual $G1_1$ are combined with the gene of the Y-axis rotation angle of another individual, as well as a new individual in which the gene of the Y-axis rotation angle of the best individual $G1_1$ is combined with the gene of the X-axis rotation angle and the gene of the Z-axis rotation angle of the other individual are generated for each of the pairs. For example, as illustrated in FIG. 11, new individuals $G1_{12}$ and $G1_{21}$ are generated from the pair of the individual $G1_1$ and $G1_2$.

Next, at step S107, the inclination angle determining processor 62 performs mutation. In the mutation, a new individual having a new combination of genes is generated according to a predetermined rule. The technique of mutation is not limited in any way, and various known techniques of mutation may be used. Herein, mutation is caused at a predetermined proportion for the individuals with an evaluation function J value of equal to or less than 0. For example, the genes of the X-axis rotation angle, the Y-axis rotation angle, and the Z-axis rotation angle are randomly swapped for the individuals with an evaluation function J value of equal to or less than 0. For example, it is assumed that the evaluation function J value of the individual $GS_n$ is equal to or less than 0. In this case, in the individual $GS_n$, the gene of the X-axis rotation angle is replaced with the gene of the Z-axis rotation angle, the gene of the Y-axis rotation angle is replaced with the gene of the X-axis rotation angle, the gene of the Z-axis rotation angle is replaced with the gene of the Y-axis rotation angle. Thus, a new individual $GS_{n'}$ is generated as a result of mutation.

Next, at step S108, the inclination angle determining processor 62 performs fitness evaluation. In the fitness evaluation, the evaluation function J values are calculated respectively for the n individuals selected at step S105 and the new individuals generated at step S106 and step S107. Then, the individuals with an evaluation function J value of greater than 0 are sorted in descending order of number of supports 30. In other words, when an individual has a smaller number of supports 30, the individual is ranked higher as a better individual. Among them, the individual with the highest rank is defined as the best individual. Hereinafter, the best individual after the sorting is referred to as an individual $G3_1$.

Next, at step S109, the inclination angle determining processor 62 performs a termination determination. Herein, the X-axis rotation angle and the Y-axis rotation angle of the best individual $G3_1$ obtained at step S108 are changed only by predetermined angles to generate a new individual. The predetermined angles may be, for example, about +2° and about −2°, although the predetermined angles are not limited thereto. For example, the X-axis rotation angle and the Y-axis rotation angle of the best individual $G3_1$ are shifted by about −2° to generate an individual $G3_{1'}$. Next, after the number of supports 30 of the individual $G3_{1'}$ is calculated, the evaluation function J value thereof is calculated. Then, if the evaluation function J value of the individual $G3_{1'}$ is greater than 0, the number of supports 30 of the individual $G3_{1'}$ is compared with the number of supports 30 of the best individual $G3_1$ obtained at step S108. Then, if the number of supports 30 of the individual $G3_{1'}$ is smaller, the determination result is NO, so the process returns to step S105 and the process subsequent to step S105 is repeated. At step S105, the inclination angle determining processor 62 selects n individuals among the n individuals selected at the previous step S105, the new individuals generated at steps S106 and S107, and the individual $G3_{1'}$ generated at step S108.

On the other hand, if the evaluation function J value of the individual $G3_{1'}$ is less than 0, or if the evaluation function J value of the individual $G3_{1'}$ is greater than 0 and the number of supports 30 of the individual $G3_{1'}$ is greater than the number of supports 30 of the best individual $G3_1$, the inclination angle determining processor 62 determines the best individual $G3_1$ as the solution. Herein, the orientation of the target object A that has been changed according to the inclination angles identified by the best individual $G3_1$ is regarded as the optimum orientation of the target object A.

In the present preferred embodiment, a whole object 20 is formed below the holder 13 according to the position and orientation of the target object A and the number and position arrangement of the supports 30 that have been determined by the arrangement determining apparatus 100. Specifically, the supports 30 are attached and arranged below the holder 13, and the target object A is formed below the supports 30.

As thus far described, the present preferred embodiment determines the inclination angle that enables the supports 30 to be capable of supporting the load of the target object A and also significantly reduces or minimizes the number of the supports 30, with the inclination angle the target object should be inclined from a predetermined reference orientation. Therefore, when forming the target object A in the orientation that is determined in this way, the supports 30 attached and arranged on the target object A can support the load of the target object A. In addition, because the number of supports 30 is able to be kept small, the amount of the resin material necessary is able to be significantly reduced when forming the supports 30.

In the present preferred embodiment, the orientation of the three-dimensional model of the target object A to be formed is determined preferably by using a genetic algorithm. Using a genetic algorithm makes it possible to prevent an enormous amount of computation, in comparison with the case in which all the inclination angles of the target object A are obtained to obtain the optimum orientation of the target object A. As a result, it is possible to reduce computational burden.

In the present preferred embodiment, the evaluation function J used in the genetic algorithm is represented by the expression $J=L_s-S \times \max(G_t, A_s)$, where $L_s$ is the load of the target object A that can be supported by the supports 30, $G_t$ is the load of the target object A, $A_s$ is the adhesive strength between the target object A and the vat 12, and S is the safety factor. The inclination angle determining processor 62 calculates values obtained from evaluation functions J for a plurality of inclination angles generated by the candidate generating processor 58. Then, the inclination angle determining processor 62 determines, among the inclination angles with an evaluation function J value of greater than 0, an inclination angle that significantly reduces or minimizes the number of supports 30, with the inclination angle the target object A is to be inclined from the reference orientation. Thus, by using the evaluation function J, the supports 30 are able to be attached and arranged in an appropriate manner so that the supports 30 bear one of the loads of the load $G_t$ of the target object A to be formed or the adhesive strength $A_s$ that is greater than the other.

In the present preferred embodiment, the target object A to be formed preferably includes a forbidden surface a, in which supports 30 should not be attached or arranged. The candidate generating processor 58 excludes from the candidates such inclination angles that cause the supports 30 to be attached and arranged on the forbidden surface a. As a result, the candidate generating processor 58 is configured or programmed to select such inclination angles that no support is attached or arranged on the forbidden surface as the candidates. As a result, the angle by which the target object A should be inclined from a predetermined reference orientation is set to the inclination angle at which no support 30 is attached or arranged on the forbidden surface a.

In the present preferred embodiment, the arrangement determining apparatus 100 includes a pre-processing processor 54 configured or programmed to perform a smoothing process, which is a pre-process, on the target object model stored in the storing processor 52, as illustrated in FIG. 7. The reference processor shifts and rotates the target object model that has been subjected to the smoothing process by the pre-processing processor so as to set the target object model into a predetermined reference position and orientation. Thus, the amount of data of the target object model is reduced by smoothing the target object model with the pre-processing processor 54. Therefore, the reference processor 56, the candidate generating processor 58, the support calculating processor 60, and the inclination angle determining processor 62 are allowed to use a three-dimensional model whose amount of data is reduced by the pre-processing processor 54. As a result, it is possible to reduce computational burden in a desirable manner.

Hereinabove, the three-dimensional printing system equipped with the arrangement determining apparatus 100 as well as the method of determining an arrangement of supports 30 has been described according to preferred embodiments of the present invention. However, the three-dimensional printing system equipped with the arrangement determining apparatus according to a preferred embodiment of the present invention and the method of determining an arrangement of supports according to a preferred embodiment of the present invention are not limited to the three-dimensional printing system equipped with the support arrangement determining apparatus 100 and the method of determining an arrangement of supports 30 according to a preferred embodiment of the present preferred embodiment.

Other Preferred Embodiments

In the above-described preferred embodiments, when the arrangement determining apparatus 100 determines the number and position arrangement of the supports 30 at step S101, the pre-processing processor 54 performs a smoothing process on the target object model stored in the storing processor 52 in advance. However, the pre-processing at step S101 may be eliminated. In this case, the reference processor 56 may shift and rotate the target object model stored in the storing processor 52 so as to set the target object model into a predetermined reference position and orientation.

As described previously, the processors in the arrangement determining apparatus 100, namely the storing processor 52, the pre-processing processor 54, the reference processor 56, the candidate generating processor 58, the support calculating processor 60, and the inclination angle determining processor 62, may be implemented by a single processor provided in the arrangement determining apparatus 100. However, these processors may be implemented by a plurality of processors. In various preferred embodiments of the present invention, the configuration includes executing a computer program stored in a computer. Various preferred embodiments of the present invention include a non-transitory computer readable medium in which the computer program is temporarily stored. Various preferred embodiments of the present invention also include a circuit that implements the same functions as those implemented by the programs executed by the respective processors. In that case, it is possible that the storing processor 52, the pre-processing processor 54, the reference processor 56, the candidate generating processor 58, the support calculating processor 60, and the inclination angle determining processor 62 be replaced with a storing circuit 52, a pre-processing circuit 54, a reference circuit 56, a candidate generating circuit 58, a support calculating circuit 60, and an inclination angle determining circuit 62, respectively.

The terms and expressions which have been used herein are used as terms of description and not of limitation. There is no intention in the use of such terms and expressions of excluding any equivalents of any of the features shown or described, or portions thereof, and it is recognized that various modifications are possible within the scope of the present invention. The present invention may be embodied in many different forms. This disclosure should be considered as providing exemplary preferred embodiments of the principles of the present invention. These preferred embodiments are described herein with the understanding that such preferred embodiments are not intended to limit the present invention to any specific preferred embodiments described and/or illustrated herein. The present invention is not limited to specific preferred embodiments described herein. The present invention encompasses all the preferred embodiments including equivalents, alterations, omissions, combinations, improvements, and/or modifications that can be recognized by those skilled in the arts based on this disclosure. Limitations in the claims should be interpreted broadly based on the language used in the claims, and such limitations should not be limited to specific preferred embodiments described in the present description or discussed during prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing system comprising:
a three-dimensional printing apparatus that forms a target object and supports; and
a support arrangement determining apparatus that determines a number and position arrangement of the supports, for use with the three-dimensional printing apparatus wherein the supports are attached and arranged on the target object to be formed to form the target object and the supports, the support arrangement determining apparatus including:
a storing processor configured or programmed to store data of a three-dimensional model of the target object;
a reference processor configured or programmed to shift and rotate the three-dimensional model stored in the storing processor so as to set the three-dimensional model into a predetermined reference position and orientation;
a candidate generating processor configured or programmed to generate a plurality of inclination angles that are candidates for the orientation of the target object to be formed, based on the three-dimensional model arranged in the predetermined reference position and orientation by the reference processor;
a support calculating processor configured or programmed to calculate the number of supports to be attached and arranged on the target object, for each of the three-dimensional models inclined based on the inclination angles generated by the candidate generating processor; and
an inclination angle determining processor configured or programmed to determine, among the plurality of inclination angles generated by the candidate generating processor, an inclination angle that enables the supports to support a load of the target object and that reduces or minimizes the number of the supports calculated by the support calculating processor, and with the inclination angle the target object is inclined from a predetermined reference orientation; wherein
the three-dimensional printing apparatus forms the target object and the supports based on the position and orientation of the target object, and the three-dimensional printing apparatus forms the number of the supports based on the inclination determined by the inclination angle determining processor.

2. The three-dimensional printing system according to claim 1, wherein the inclination angle determining processor is configured or programmed to use a genetic algorithm to determine, among the plurality of inclination angles generated by the candidate generating processor, an inclination angle that enables the supports to support the load of the target object and that reduces or minimizes the number of the supports calculated by the support calculating processor, and with the inclination angle the target object is inclined from the predetermined reference orientation.

3. The three-dimensional printing system according to claim 2, wherein
an evaluation function J used in the genetic algorithm is represented by:

$$J=Ls-S\times\max(Gt, As),$$

where Ls is a load of the target object that is able to be supported by the support, Gt is the load of the target object, As is an adhesive strength between the target object and the three-dimensional printing apparatus, and S is a safety factor; and
the inclination angle determining processor is configured or programmed to calculate a value obtained from the evaluation function for each of the plurality of inclination angles generated by the candidate generating processor, and determine, among the inclination angles with a value of the evaluation function being greater than 0, an inclination angle that reduces or minimizes the number of supports calculated by the support calculating processor, and with the inclination angle the target object model is inclined from the predetermined reference orientation.

4. The thee-dimensional printing system according to claim 1, wherein
the target object includes a forbidden surface in which the supports are not to be attached or arranged; and
the candidate generating processor is configured or programmed to exclude from the candidates inclination angles that cause the supports to be attached and arranged on the forbidden surface.

5. The three-dimensional printing system according to claim 1, further comprising
a pre-processing processor configured or programmed to perform a smoothing process, which is a pre-process, on the three-dimensional model stored in the storing processor; wherein
the reference processor is configured or programmed to shift and rotate the three-dimensional model that has been subjected to the smoothing process by the pre-processing processor so as to set the three-dimensional model into a predetermined reference position and orientation.

6. A method of forming a target object and supports including a process of determining an arrangement of the supports, for use with a three-dimensional printing apparatus wherein the supports are attached and arranged on the target object to be formed to form the target object and the supports, for determining a number and position arrangement of the supports, the method comprising:
a storing step of storing data of a three-dimensional model of the target object;
a reference step of shifting and rotating the three-dimensional model stored in the storing step so as to be in a predetermined reference position and orientation;
a candidate generating step of generating a plurality of inclination angles that are candidates for the orientation of the target object to be formed, based on the three-dimensional model arranged in the predetermined reference position and orientation in the reference step;
a support calculating step of calculating the number of supports to be attached and arranged on the target object, for each of the three-dimensional models inclined based on the inclination angles generated in the candidate generating step;

an inclination angle determining step of determining, among the plurality of inclination angles generated in the candidate generating step, an inclination angle that enables the supports to support a load of the target object and that reduces or minimizes the number of the supports calculated in the support calculating step, and with the inclination angle the target object is inclined from the predetermined reference orientation; and a step of forming, by the three-dimensional printing apparatus, the target object and the supports based on the position and orientation of the target object, and forming the number of supports based on the inclination determined in the inclination angle determining step.

7. The method according to claim 6, wherein, in the inclination angle determining step, a genetic algorithm is used to determine, among the plurality of inclination angles generated in the candidate generating step, an inclination angle that enables the supports to support the load of the target object and that reduces or minimizes the number of the supports calculated in the support calculating step, and with the inclination angle the target object is inclined from the predetermined reference orientation.

8. The method according to claim 7, wherein
an evaluation function J used in the genetic algorithm is represented by:

$$J = L_s - S \times \max(G_t, A_s),$$

where $L_s$ is a load of the target object that is able to be supported by the support, $G_t$ is the load of the target object, $A_s$ is an adhesive strength between the target object and the three-dimensional printing apparatus, and $S$ is a safety factor; and the inclination angle determining step comprises calculating a value obtained by the evaluation function for each of the plurality of inclination angles generated in the candidate generating step, and determining, among the inclination angles with an evaluation function value of greater than 0, an inclination angle that reduces or minimizes the number of the supports calculated by in the support calculating step, and with the inclination angle the target object is inclined from the reference orientation.

9. The method according to claim 6, wherein
the target object includes a forbidden surface in which the supports are not to be attached or arranged; and
in the candidate generating step, inclination angles that cause the supports to be attached and arranged on the forbidden surface are excluded from the candidates.

10. The method according to claim 6, further comprising
a pre-processing step of performing a smoothing process, which is a pre-process, on the three-dimensional model stored in the storing step; wherein
in the reference step, the three-dimensional model that has been subjected to the smoothing process in the pre-processing step is shifted and rotated so as to set the three-dimensional model into a predetermined reference position and orientation.

* * * * *